United States Patent

[11] 3,613,094

| | | | |
|---|---|---|---|
| [72] | Inventor | Henry Giles Ilford, England | |
| [21] | Appl. No. | 823,748 | |
| [22] | Filed | May 12, 1969 | |
| [45] | Patented | Oct. 12, 1971 | |
| [73] | Assignee | The Plessey Company Limited Ilford, England | |
| [32] | Priority | May 15, 1968 | |
| [33] | | Great Britain | |
| [31] | | 23189/68 | |

[54] RADAR DISPLAY SYSTEM
3 Claims, 5 Drawing Figs.

[52] U.S. Cl. ............................................. 343/13 R, 343/17.1 R
[51] Int. Cl. ............................................. G01s 7/06
[50] Field of Search ............................................. 343/5 DP, 12, 13, 17.1, 17.1 PF

[56] References Cited
UNITED STATES PATENTS

| 2,552,022 | 5/1951 | Watson et al. | 343/13 |
| 3,199,104 | 8/1965 | Miller | 343/5 DP |
| 3,229,288 | 1/1966 | Massey | 343/17.1 |
| 3,325,729 | 6/1967 | Vinzelberg et al. | 343/5 DP |
| 3,380,018 | 4/1968 | Littrell et al. | 343/5 DP |

Primary Examiner—Malcolm F. Hubler
Attorney—Scrivener, Parker, Scrivener & Clarke ABSTRACT: A radar system including a digital timing system comprising division stages and gating means arranged such that all control pulses required are derived from a master oscillator or clock pulse generator.

RADAR DISPLAY SYSTEM

A pulse modulated radar system requires a number of controlling and pulse waveforms to determine the timing of different functions and most of these functions must vary with the range displayed. In conventional systems pulse duration and pulse repetition rates are determined by a number of individual circuits each being selected by the range change switch and many having separate preset controls for each range in use. Complex circuits and switches result, and setting up adjustments must be made to one or more controls for every range. This is an expensive operation requiring external calibration equipment which may be subject to inaccuracy and drift.

According to the present invention a radar equipment comprises a pulse generator system which provides digitally, in dependence upon the frequency of a master oscillator, modulation pulses for the radar transmitter and calibration pulses for the cathode-ray tube display the generator system including pulse counter means having an effective division ratio settable in accordance with the selected displayed range and further countermeans having preset division ratios whereby the frequency and length of all pulses generated is adjusted automatically in accordance with the setting of the pulse counter means.

Some exemplary embodiments of the invention will now be described with reference to the accompanying drawings in which.

Figure 1:
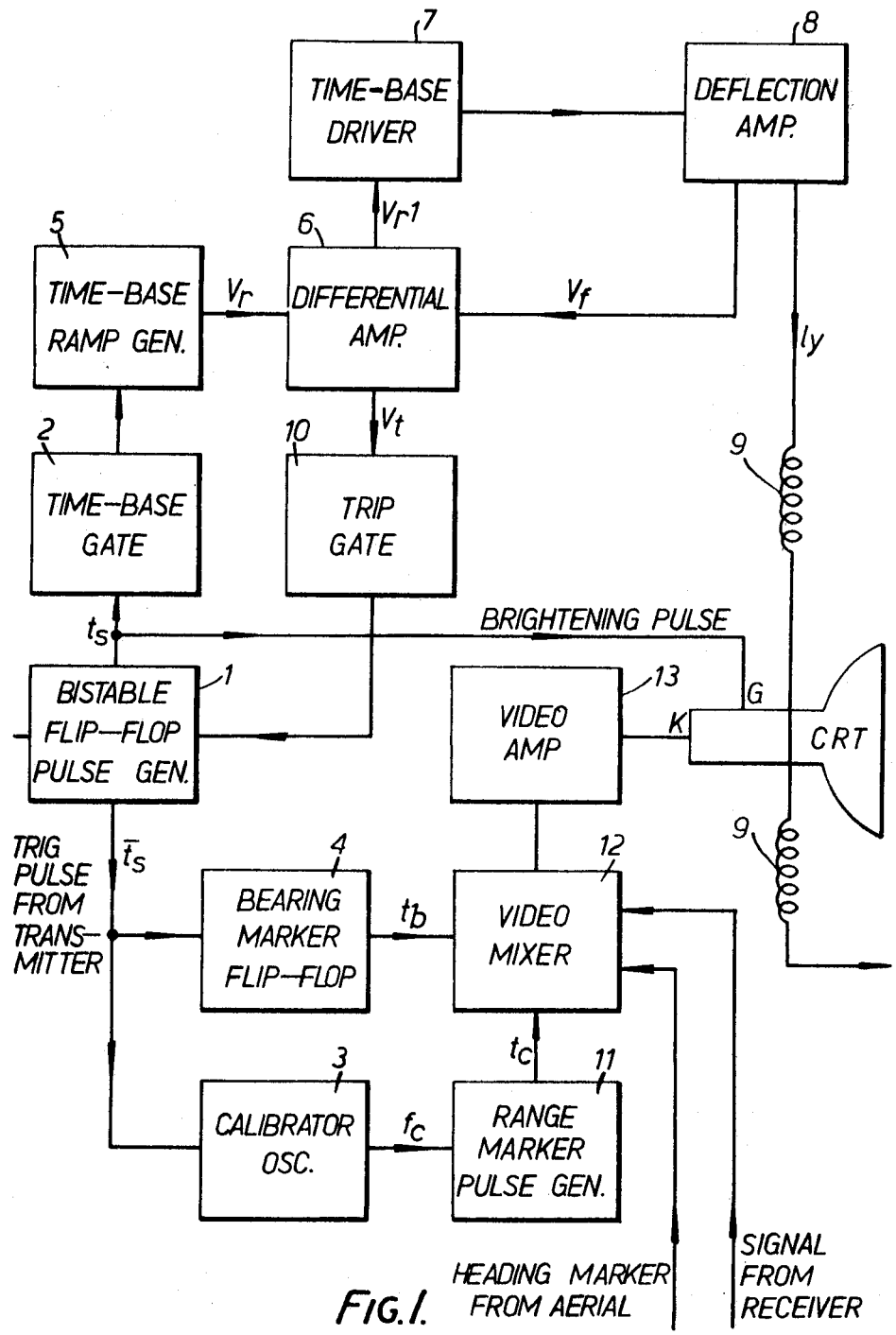
FIG. 1 is a generally schematic block diagram of a conventional analogue radar system.
Figure 2:
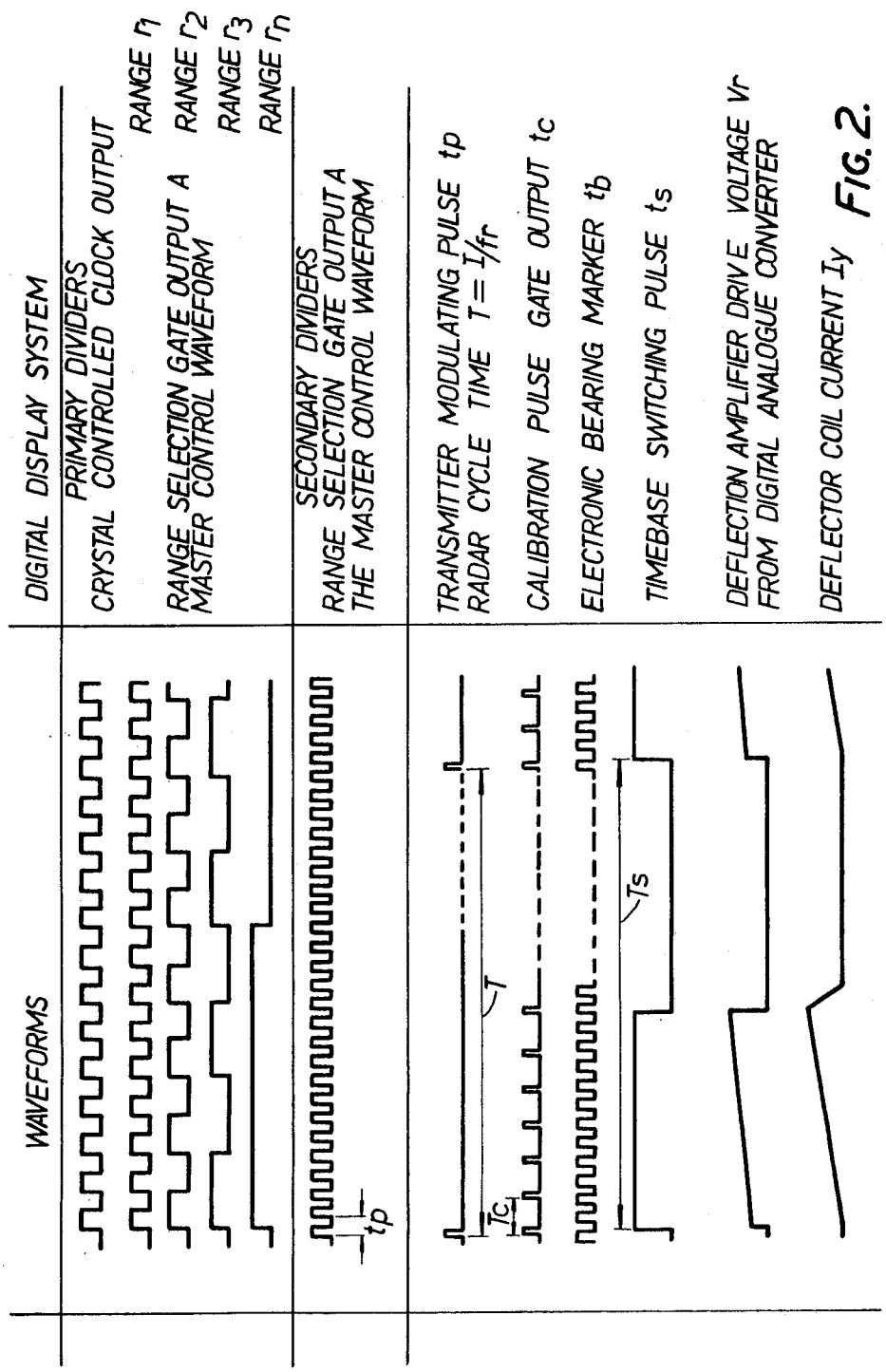
FIG. 2 is a waveform diagram showing the kind of waveforms required for a radar system.

The operation of a conventional analogue plan position indicator radar display system will now be described with reference to FIG. 1 and also with reference to some of the waveforms shown in FIG. 2. A trigger pulse $tp$ derived at a transmitter switches a bistable flip-flop 1 into its active state the leading edge of a resulting output waveform $ts$ from the flip-flop 1 operates a time base enabling gate 2 and its inverse output $\overline{t_s}$ controls range calibration oscillator 3 and an electronic bearing marker generator 4 which takes the form of a flip-flop. At the onset of waveform $t_s$ the time base gate 2 produces a step pulse which is applied to initiate a linear rise in the ramp output waveform from a ramp generator 5 producing a composite waveform $Vr$. This is applied to one input terminal of a differential amplifier 6 and to the other input terminal, a linearising feedback voltage $Vf$ is applied from a source to be considered later. The resulting output from the differential amplifier 6 is a modified ramp voltage waveform $Vr'$ which is similar to $Vf$ and which feeds a time base driver stage 7 and suitable impedance conversion takes place in this stage to drive a deflection amplifier 8. The modified ramp voltage waveform $Vr'$ is converted by the deflection amplifier 8 to provide in its associated rotating deflection coils 9 a linear ramp current $ly$ thereby deflecting magnetically the cathode-ray tube beam which is deflected from the center of the cathode-ray tube to its effective periphery at a rate predetermined by the time base generator 5 and selected by operation of a range scale switch (not shown). Time base linearity is achieved by a small noninductive resistor (not shown) connected in series with the deflection amplifier 8 and scan coils 9 the resulting voltage $Vf$ across this resistor is applied as mentioned previously to the other input of the differential amplifier 6. From a further terminal of the differential amplifier a ramp voltage proportional to the current in the deflection coils is picked off and applied to a variable threshold trip gate 10. A preset threshold level is adjusted to permit a switching voltage to reset the bistable flip-flop 1 to its quiescent state when the desired length of time base scan has been reached thereby terminating and forming fully the $t_s$ waveform.

From other terminals of the bistable flip-flop 1 the pulses $\overline{t_2}$ of similar duration to that of $t_s$ but opposite phase are applied to modulate and phase-lock the range calibration oscillator 3 and bearing marker generator 4. A further pulse from the same source and of duration $t_s$ is applied to the cathode-ray tube beam current modulating electrode G. Its purpose is to brighten the forward time base train and to blank out return signals during the fly back period. Range marker pulses $t_b$ are usually derived from a ringing circuit (not shown) comprising high-Q reactive components L and C (not shown) triggered by and phase-locked to the start of the time base enabling pulse $t_s$. The pulses thus derived are shaped so that their duration is fixed at a length comparable with a return signal from a discrete target on the shortest range scale of view. To achieve a reasonable degree of accuracy each pulse must occur at the same phase angle in each cycle of the calibrator oscillator 3 waveform $f_c$, and the first pulse must occur at the onset $t_s$ and the remainder at one cycle intervals. These conditions are difficult to achieve but are satisfied by triggering the pulse generator 11 at the instant when the waveform $f_c$ crosses the zero line. Critical positive feedback is necessary to overcome circuit decrement and maintain constant amplitude.

The pulse generator 11 from which the marker pulses $t_c$ are derived is triggered once per calibrator oscillator cycle. Thus the interval between fixed markers may be changed by changing the frequency of the calibrator oscillator 3. This is achieved by switching with the range scale, or switching independently, suitable L/C combinations.

A train of electronic bearing marker pulses $t_b$ is initiated by a switch closing at any selected azimuth position and is derived from an astable flip-flop designed to give an approximately equal mark/space pulse during the period $t_s$. To provide the same number of mark/space periods for all ranges introduces further switching complexity. It is therefore normal to select one or possibly two switching rates as a compromise. A further marker is normally provided at the radar display to indicate the heading position or a given bearing, magnetic north for example. This is derived at the radar aerial and is achieved by initiating or forming at a given azimuth position a voltage pulse whose duration is not less than the radar reflection time of the longest range scale of view. The marker pulses $t_c$ and $t_b$ are combined with the detected signal and header marker pulse in a video mixer stage 12 and thereafter amplified by amplifier 13 so as suitably to modulate the cathode-ray tube CRT beam current. Thus a plan position picture is derived on which is displayed, the return signals from fixed and moving targets, fixed range marker rings, a header marker or bearing datum derived from the aerial unit, and a variable bearing marker shown as a dotted radial line.

It will be appreciated therefore that the conventional system utilizes a multiplicity of circuits each requiring individual adjustment and furthermore it utilizes variable components often introducing inaccuracies due to maladjustment and drift with temperature.

Figure 3:
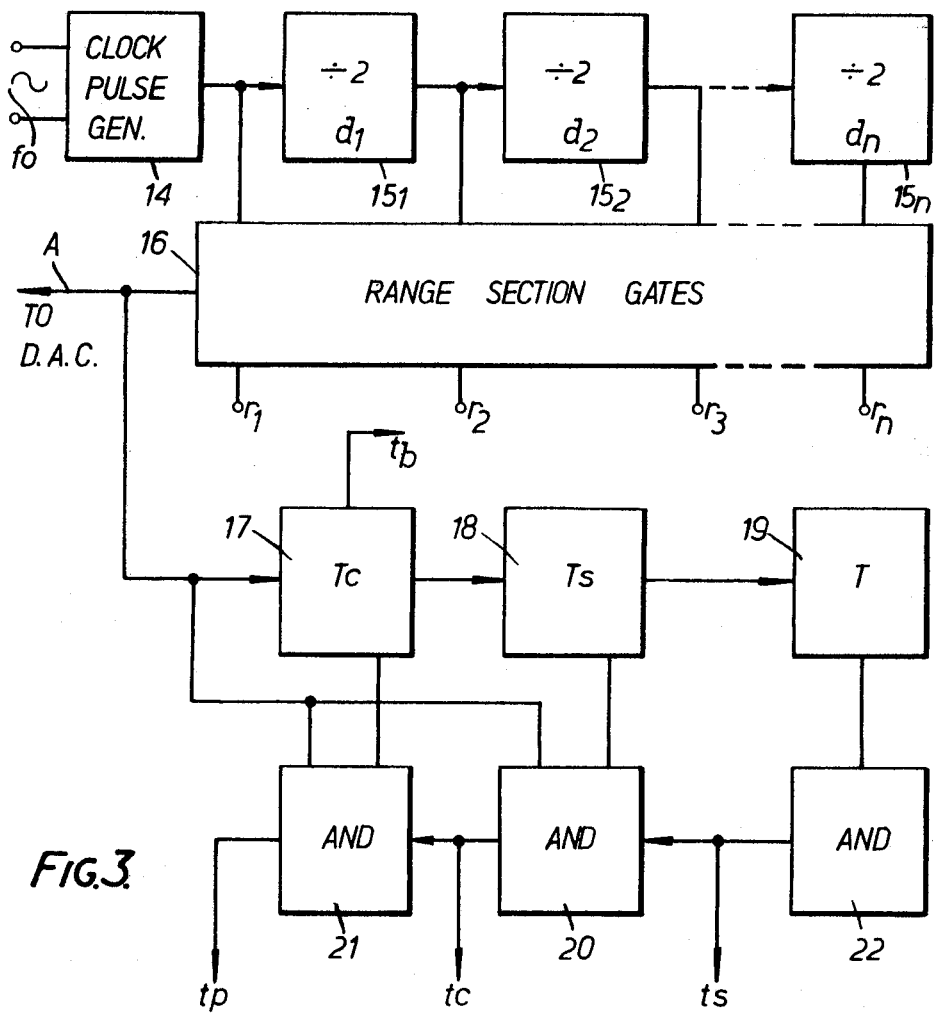
FIG. 3 is a generally schematic block diagram of a digital system for providing some of the waveforms of FIG. 2.

Referring now to FIG. 3 a digital pulse generation system will now be described for producing the pulses required by a radar system.

A radar system requires, as will be apparent from the description of the conventional system, the following waveforms for its operation. A transmitter control pulse $t_p$ recurring at a frequency $f_r$, a time base switching pulse $t_s$ whose duration is proportional to the range scale of view, means determining the rate of rise of the scan current appropriate to the range in view, a cathode-ray tube brightening or signal switching pulse which enables received signals to be displayed during the forward scan stroke only, marker pulses spaced at appropriate intervals to provide a visible measuring scale appropriate to the range in view, and additionally in certain systems a bearing reference pulse which indicates some bearing or data reference such as magnetic north and a bearing marker pulse or pulses which may be adjusted to indicate the bearing of any chosen target. In FIG. 3 the output from a master oscillator 14 is provided in square waveform at a frequency $f_o$ and applied to a bank of primary dividers $15_1$, $15_2$.............$15_n$, each producing a squarewave similar to that of the clock pulse generator but reduced in frequency by a factor of 2. The output from the clock pulse generator 14, or the output from any of the primary dividers 15 may be selected by means of a series of range selection gates 16 controlled in accordance with the position of the range switch (not shown) but having switches $r_1$, $r_2$, $r_3$............$r_n$ each corresponding with the appropriate divider stages to provide a master control waveform at point A appropriate to the range scale required. Although the primary dividers in FIG) 3 each divide by 2 other ratios or combinations of division ratios may equally well be adopted in accordance with the system chosen.

Figure 4:
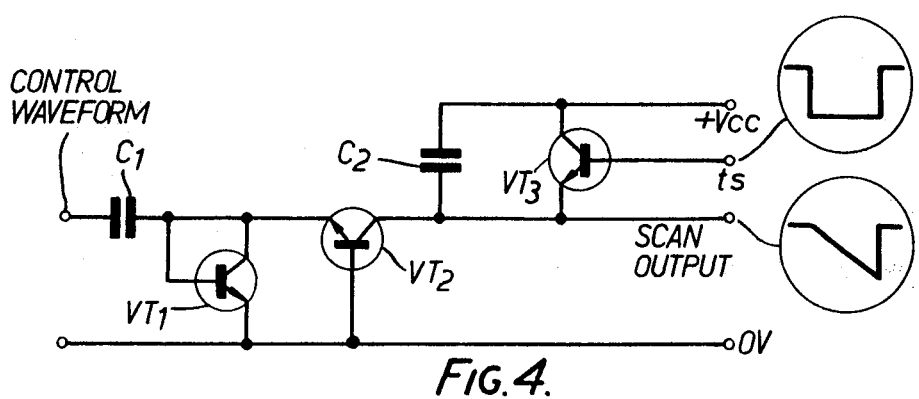
FIG. 4 is a circuit diagram of an analogue/digital converter for use with a radar system according to the invention.

A selected master control waveform at point A is further scaled by secondary dividers 17, 18 and 09 which in combination with recognition gates 20, 21 and 22 provide special pulses at predetermined intervals as required by a radar system as hereinbefore described. The waveform at point A 15, in this example, also supplied to a digital-to-analogue converter (not shown in this FIGURE) which provides the time base ramp waveform, although an analogue time base system comprising blocks 5, 6, 7 and 8 only of FIG. 1 may be used wherein gating of ramp generator 5 is effected by a signal produced from the digitally derived time base switching waveform at point A. A first secondary divider stage 17 provides the range calibration marker interval and from which by means of a suitable coincidence gate 21 calibration marker pulses are derived. A second stage divider 18 determines the time base duration corresponding to a fixed number of range marker pulses and in conjunction with gates 20 produces either one pulse of the required length or initiating and terminating pulses from which a long pulse may be derived for time base gating. The long pulse so formed also provides cathode-ray tube brightening or signal gating during time base scan. A final stage divider 19 determines the duration of the complete radar cycle the recommencement of other functions and via a coincidence gate 22 the generation of pulses $t_p$ as shown in the waveform diagram 2 for modulator control. A square waveform electronic bearing marker $t_b$ is derived from the secondary divider stage 17 and requires no gating. This waveform remains locked to scan and its frequency is directly proportional to that of the master control waveform. The basic scanning waveform is provided by a digital-to-analogue conversion of the waveform at point A followed by a suitable low-pass filter. The converter is of the pulse counting type and its output at any instant during a scan is proportional to the number of pulses applied to it since the commencement of the scan. As shown in FIG. 4 one suitable digital to analogue converter circuit comprises a capacitor $C_1$ which acts for transferring a measured charge from each input pulse via a transistor $T_2$ to a reservoir capacitor $C_2$. Thus the voltage across $C_2$ rises in uniform steps with time at a rate determined by a pulse frequency applied at the input and will always reach the same level after a given number of counts. A linear staircase waveform results if the load resistance across the capacitor $C_2$ is infinite. For practical purposes a reasonably high order of linearity is achieved if a high-buffer impedance is connected at the output. The amount of charge transferred by $C_1$ should be constant irrespective of pulse length and this will be the case if $C_1$ is supplied from a constant voltage source by a pulse of constant amplitude. In order to satisfy these conditions a buffer amplifier (not shown) is interposed between the primary dividers 15 and the digital/analogue converter input. Scan duration is determined from $t$
transistor VT
capacitor $C_2$. If an analogue time base system is used of the kind shown in FIG. 1 the ramp generator 5 may be triggered from pulse $t_s$ thereby to accurately determine the scan duration.

Figure 5:
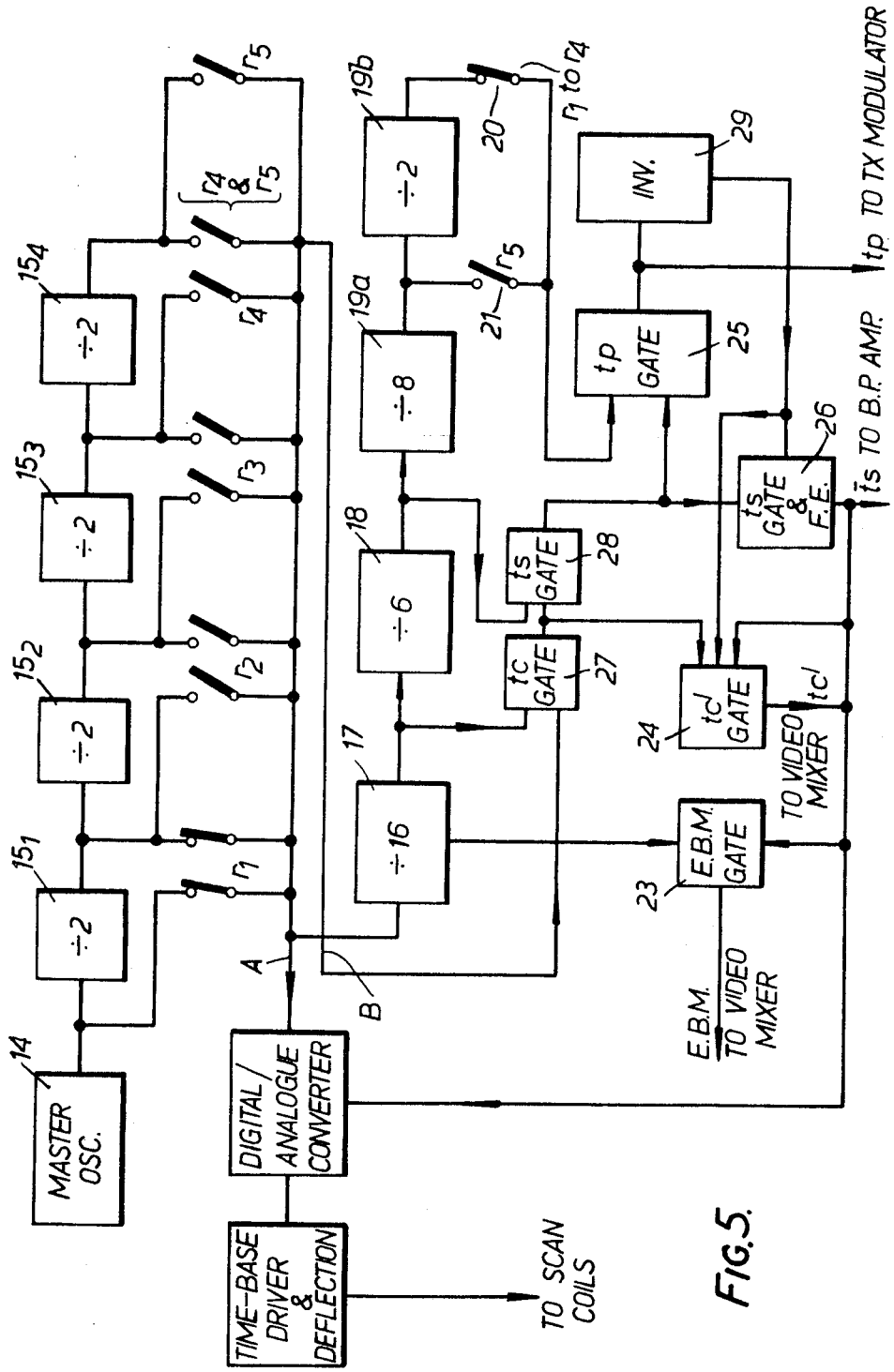
FIG. 5 is a more comprehensive block schematic diagram of a digital pulse generator system for use with a radar system according to the present invention.

Turning now to FIG. 5 there is shown a block schematic diagram corresponding generally with the diagram of FIG. 3 and bearing where appropriate the same numerical designations as FIG. 3, but showing the switches associated with range selection gates 16 and digital-to-analogue converter and time base driver amplifier. The master oscillator 14 feeds a serially connected chain of four primary dividers $15_1$, $15_2$, $15_3$ and $15_4$ and the output of the master oscillator 14 or the output from one of the dividers is applied to line A and B in accordance with the setting of gates $r_1$ $r_2$ $r_3$ and $r_4$. The secondary divider 17 is a divide by 16 unit and the secondary divider 18 is a divide by 6 unit. The final secondary divider 19 is comprised of two units 19a and 19b. When gates $r_1$ to $r_4$ are set, units 19a and 19b are both in circuit to provide an overall division ratio of 16 for the divider 19 as a whole but when gate $r_5$ is set, switch 20 is opened and switch 21 is closed such that the unit 19a only is effective to afford a division ratio of 8. An electronic bearing marker pulse is provided via gate 23 which receives an output from secondary counter 17 which corresponds to a divide by 8 output instead of the divide by 16 which the counter provides at its main output. A calibration pulse output is provided from gate 24, a trigger pulse for the transmitter modulator from gate 25, and a brightening pulse is initiated by an output from gate 26. Gates 27 and 28 are coincidence gates fed respectively from the outputs of secondary dividers 17 and 18. The A output line from the range selection gates provides another coincidence input for gate 27 and its output forms another coincidence input for gate 28. Inverter 29 is provided at the output of gate 25 from which the trigger pulse to the modulator is derived to provide an inversion for pulses applied from gate 25 to gate 26.

As will be seen from the drawing and the foregoing description the necessary waveform as required for the radar system are all derived to the same order of accuracy as the clock pulse generator 14. Thus no setting up of oscillators is required for different ranges since the required waveforms are produced automatically in accordance with the setting of the range switches. As will be seen from the drawings the time base duration varies inversely with recurrence frequency over a number of ranges yielding a brilliance which is substantially constant, the transmitted pulse duration varies inversely with recurrence frequency over a number of ranges resulting in constant retransmitted power and the master oscillator frequency may be chosen in accordance with the particular system in view having regard to the picture resolution required.

It is also contemplated that performance of the system may be improved by controlling the angular position of the radar aerial in dependence upon a signal digitally derived from the master oscillator of the system.

Thus the speed of rotation of the aerial may be controlled in accordance with a signal derived digitally from the master oscillator as for example by means of a thyristor controlled two-phase induction motor coupled to drive the aerial at a speed determined by the frequency of a thyristor gating pulse train derived from the master oscillator so as to have a frequency proportional to the range scale selected.

It is also contemplated that a variable range marker may be provided, the precise position of which on the radar display would be indicated digitally thereby to afford a high order of accuracy. Such a variable range marker may be achieved by providing an appropriate waveform derived from the master oscillator and employed to produce a staircase voltage waveform. The number of steps from the origin is displayed on a number tube at a rate too high for the eye to retain. At the required range the staircase is terminated by a signal from a voltage comparator set by the variable range control. At the terminating point on the staircase a marker pulse is generated to intensity modulate the cathode-ray tube at the same set time each radar cycle and thus provide a marker ring that can be varied in range as required. The terminating point on the staircase waveform is the same in successive radar cycles for a given range setting. The digits at the number tube indicating the range setting are thus recognisable by virtue of the fact that the same number corresponding to the terminating point on the staircase is repeatedly illuminated.

It is also proposed that the pulse generator system may be positioned at the transmitter, thereby saving 19 one-way cable delay. Furthermore by selecting a suitable frequency for the master oscillator from which all pulses are derived, the master oscillator may be employed in a dual role to provide also the reference frequency for automatic frequency control of a superheterodyne local oscillator. calibration or In view of the fact that the pulse generator system requires reasonably ripple-free power supplies to avoid malfunction of the divider, it is proposed that power should be provided from a static inverter synchronized to a frequency derived from the master oscillator. In this way, it is clearly possible to arrange for the frequency of the power supply to be a subharmonic or submultiple of the master oscillator thereby eliminating random ripple and permitting the use of reduced capacitor values for power supply smoothing.

I claim:

1. Radar equipment comprising a pulse generator system including a master oscillator in dependence upon the frequency of which modulation pulses for a radar transmitter and calibration pulses for a cathode-ray tube display of the system are provided, a plurality of serially connected divider stages, gating means connected to the output of each of said stages, at least one pulse delivery line connnected to receive pulses from a selected gate, the selected gate being selected in accordance with a particular range setting, a plurality of serially connected fixed division ratio counters, the first of which is connected to receive pulses from said delivery line, a plurality of further gates operatively connected to both of said counters and to said delivery line, a plurality of pulse output lines fed from said gates to provide the calibration for the cathode-ray tube display of the system and a time base system connected with one of said output lines to receive pulses which determine in accordance with the range selected the radar time base frequency.

2. Radar equipment as claimed in claim 1 wherein the time base system comprises a digital-to-analogue converter to which is applied pulses from said delivery line to facilitate the production of a step ramp waveform initiated by pulses from the said one of the output lines.

3. Radar equipment as claimed in claim 1, wherein the time base system comprises a time base ramp generator to which the pulses from the said one output line are applied, a deflection amplifier, a driving amplifier feeding said deflection amplifier and a differential amplifier fed to one input thereof by the time base ramp generator and at the other input thereof with a feedback voltage from said deflection amplifier to provide a linearised input voltage for said driver amplifier.